(12) United States Patent
Noh et al.

(10) Patent No.: US 8,565,179 B2
(45) Date of Patent: Oct. 22, 2013

(54) METHOD AND APPARATUS FOR TRANSMITTING SOUNDING REFERENCE SIGNAL IN RADIO COMMUNICATION SYSTEM

(75) Inventors: Min Seok Noh, Anyang-si (KR); Jae Hoon Chung, Anyang-si (KR); Yeong Hyeon Kwon, Anyang-si (KR); Seung Hee Han, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 13/320,513

(22) PCT Filed: May 17, 2010

(86) PCT No.: PCT/KR2010/003103
§ 371 (c)(1),
(2), (4) Date: Nov. 14, 2011

(87) PCT Pub. No.: WO2010/131933
PCT Pub. Date: Nov. 18, 2010

(65) Prior Publication Data
US 2012/0076115 A1    Mar. 29, 2012

Related U.S. Application Data

(60) Provisional application No. 61/178,818, filed on May 15, 2009, provisional application No. 61/310,712, filed on Mar. 5, 2010.

(30) Foreign Application Priority Data

May 14, 2010    (KR) .................. 10-2010-0045448

(51) Int. Cl.
*H04W 4/00* (2009.01)
*H04J 3/06* (2006.01)

(52) U.S. Cl.
USPC ............................................ 370/329; 370/503

(58) Field of Classification Search
USPC ................... 370/328, 329, 503, 509
See application file for complete search history.

(56) References Cited

U.S. PATENT DOCUMENTS

2008/0298497 A1   12/2008   Cho et al.
2009/0290549 A1*  11/2009   Tiirola et al. ............... 370/329

(Continued)

FOREIGN PATENT DOCUMENTS

KR   10-2008-0088525 A   10/2008
KR   10-2008-0096334 A   10/2008
KR   10-2009-0024272 A   3/2009

OTHER PUBLICATIONS

Texas Instruments, "Sounding Reference Signal Assignments in E-UTRA Uplink", 3GPP TSG RAN WG1#48, R1-070725, Feb. 12-16, 2007, 6 pages.

*Primary Examiner* — Andrew Lee
(74) *Attorney, Agent, or Firm* — Birch, Stewart, Kolasch & Birch, LLP

(57) ABSTRACT

Disclosed is a method for transmitting a sounding reference signal from a terminal to a base station in a radio communication system to which carrier aggregation is applied. More specifically, the method comprises the steps of: receiving information on a plurality of uplink component carriers for transmitting periodic sounding reference signals from a base station; allocating different time resources for said periodic sounding reference signal transmitted via said plurality of uplink component carriers; and transmitting said periodic sounding reference signals to said base station using said uplink component carriers and said allocated different time resources.

10 Claims, 9 Drawing Sheets

(56) References Cited

U.S. PATENT DOCUMENTS

| | | |
|---|---|---|
| 2009/0316811 A1* | 12/2009 | Maeda et al. .................. 375/260 |
| 2010/0002647 A1 | 1/2010 | Ahn et al. |
| 2010/0067613 A1* | 3/2010 | Park et al. ..................... 375/295 |
| 2010/0238870 A1 | 9/2010 | Mitra et al. |
| 2010/0246561 A1* | 9/2010 | Shin et al. .................... 370/345 |
| 2011/0085457 A1* | 4/2011 | Chen et al. .................... 370/252 |
| 2011/0137745 A1* | 6/2011 | Goad et al. ................... 705/26.9 |
| 2011/0249548 A1* | 10/2011 | Gaal et al. ..................... 370/206 |
| 2012/0002568 A1* | 1/2012 | Tiirola et al. ................. 370/252 |
| 2012/0044906 A1* | 2/2012 | Chen et al. .................... 370/329 |
| 2012/0257582 A1* | 10/2012 | Damnjanovic et al. ....... 370/329 |
| 2012/0289247 A1* | 11/2012 | Siomina et al. ............ 455/456.1 |

* cited by examiner

FIG. 2
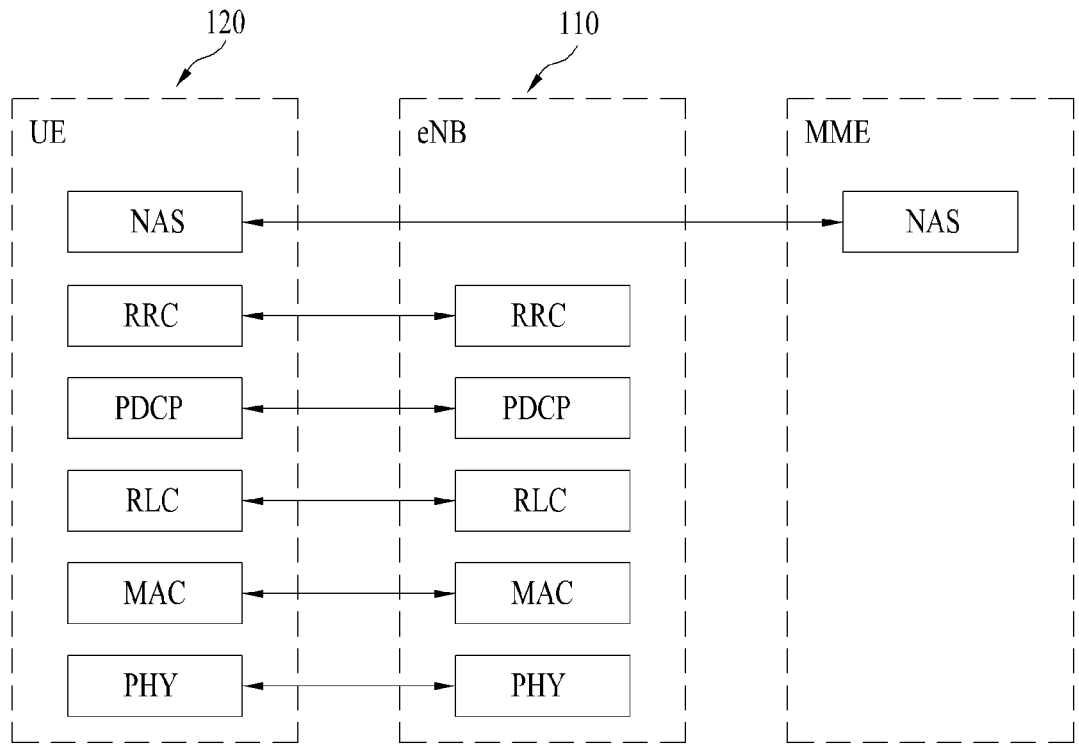
(a) CONTROL-PLANE PROTOCOL STACK
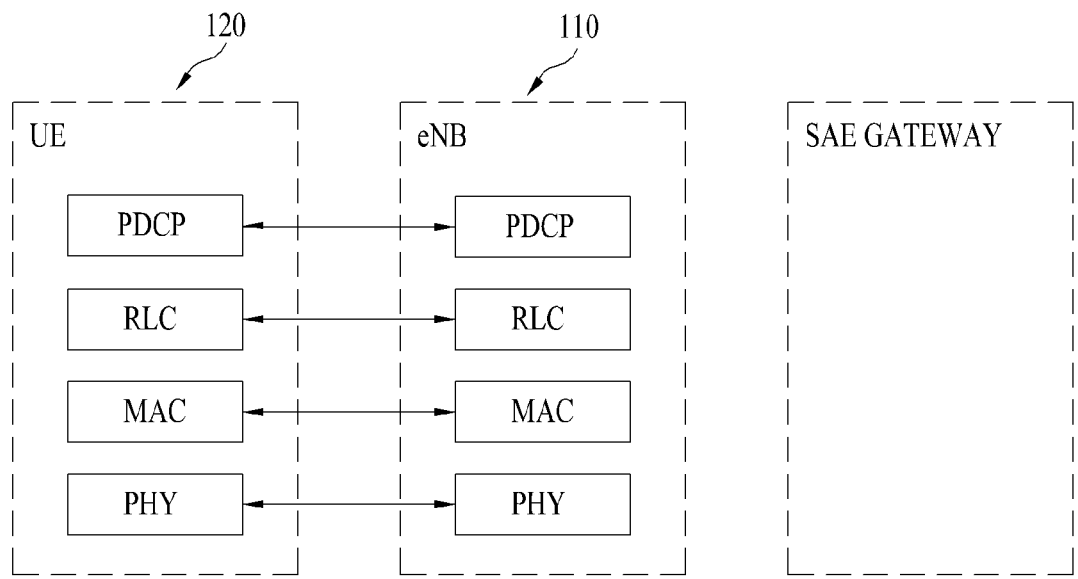
(b) USER-PLANE PROTOCOL STACK

METHOD AND APPARATUS FOR TRANSMITTING SOUNDING REFERENCE SIGNAL IN RADIO COMMUNICATION SYSTEM

This application is the National Phase of PCT/KR2010/003103 filed on May 17, 2010, which claims priority under 35 U.S.C. 119(e) to U.S. Provisional Application Ser Nos. 61/178,818 filed on May 15, 2009, 61/310,712 filed on Mar. 5, 2010 and under U.S.C. 119(a) to Patent Application No. 10-2010-0045448 filed in the Republic of Korea on May 14, 2010, all of which are hereby expressly incorporated by reference into the present application.

TECHNICAL FIELD

The present invention relates to a radio communication system, and more particularly, to a method and apparatus for transmitting sounding reference signals from a user equipment to a base station in a radio communication system.

BACKGROUND ART

As an example of a mobile communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE) 120, base stations (or eNBs or eNode Bs) 110a and 110b, and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although radio communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

Recently, the standardization of the subsequent technology of the LTE is ongoing in the 3GPP. In the present specification, the above-described technology is called "LTE-Advanced" or "LTE-A". The LTE system and the LTE-A system are different from each other in terms of system bandwidth. The LTE-A system aims to support a wideband of a maximum of 100 MHz. The LTE-A system uses carrier aggregation or bandwidth aggregation technology which achieves the wideband using a plurality of frequency blocks. The carrier aggregation enables the plurality of frequency blocks to be used as one large logical frequency band in order to use a wider frequency band. The bandwidth of each of the frequency blocks may be defined based on the bandwidth of a system block used in the LTE system. Each frequency block is transmitted using a component carrier.

DISCLOSURE

Technical Problem

An object of the present invention is to provide a method and apparatus for transmitting sounding reference signals from a user equipment to a base station in a radio communication system.

The technical problems solved by the present invention are not limited to the above technical problems and those skilled in the art may understand other technical problems from the following description.

Technical Solution

The object of the present invention can be achieved by providing a method for transmitting sounding reference signals by a user equipment in a radio communication system to which a carrier aggregation scheme is applied, including receiving information about a plurality of uplink component carriers for transmitting periodic sounding reference signals from a base station, allocating different time resources to the periodic sounding reference signals respectively transmitted via the plurality of uplink component carriers, and transmitting the periodic sounding reference signals to the base station using the uplink component carriers and the allocated different time resources.

The information about the plurality of uplink component carriers may include parameters for transmitting the periodic sounding reference signals in units of the uplink component carriers.

The information about the plurality of uplink component carriers may include information about transmission start points of the periodic sounding reference signals respectively transmitted through the plurality of uplink component carriers, and the periodic sounding reference signals respectively transmitted through the plurality of uplink component carriers may have the same transmission periodicity.

The method may further include receiving an indication for transmitting an aperiodic sounding reference signal from the base station, and transmitting the aperiodic sounding reference signal to the base station.

The aperiodic sounding reference signal may be transmitted to the base station via a predetermined uplink component carrier. The method may further include receiving resource allocation information for transmitting the aperiodic sounding reference signal from the base station, and the resource allocation information may include information about an uplink component carrier for transmitting the aperiodic sounding reference signal.

In another aspect of the present invention, there is provided a user equipment of a radio communication system to which a carrier aggregation scheme is applied, including a reception module configured to receive information about a plurality of uplink component carriers for transmitting periodic sounding reference signals from a base station, a processor configured to allocate different time resources to the periodic sounding reference signals respectively transmitted via the plurality of uplink component carriers, and a transmission module configured to transmit the periodic sounding reference signals to the base station using the uplink component carriers and the allocated different time resources.

The reception module may receive an indication for transmitting an aperiodic sounding reference signal from the base station, and the transmission module may transmit the aperiodic sounding reference signal to the base station.

The reception module may receive resource allocation information for transmitting the aperiodic sounding reference signal from the base station, and the resource allocation information may include information about an uplink component carrier for transmitting the aperiodic sounding reference signal.

Advantageous Effects

According to the embodiments of the present invention, it is possible to efficiently transmit sounding reference signals in a radio communication system.

The effects of the present invention are not limited to the above-described effects and other effects which are not described herein will become apparent to those skilled in the art from the following description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.

BEST MODE

Figure 1:
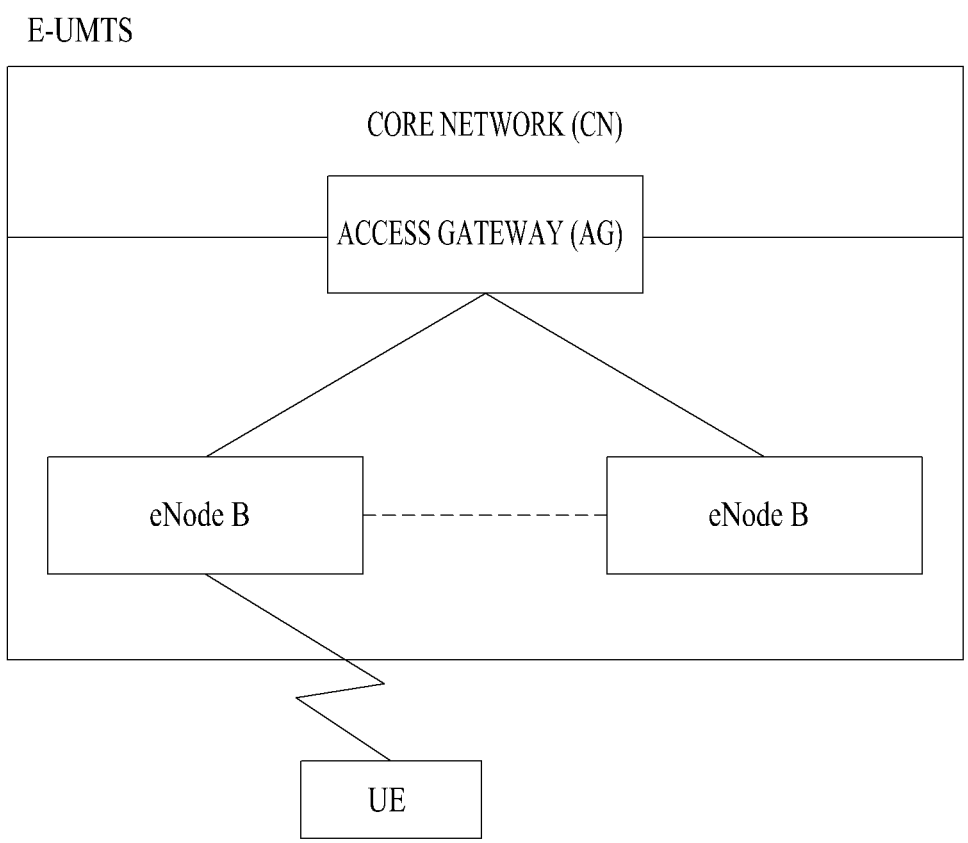
FIG. 1 is a diagram showing a network structure of an Evolved Universal Mobile Telecommunications System (E-UMTS) as an example of a mobile communication system.

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Hereinafter, a system in which a system band uses a single frequency block is referred to as a legacy system or a narrowband system. A system in which a system band includes a plurality of frequency blocks and at least one frequency blocks are used as a system block of a legacy system is referred to as an evolved system or a wideband system. The frequency block used as the legacy system block has the same size as the system block and the legacy system. The sizes of the remaining frequency blocks are not specially limited. However, in order to simplify a system, the size of the remaining frequency blocks may be determined based on the size of the system block of the legacy system. For example, a 3GPP LTE system and a 3GPP LTE-A system are evolved from a legacy system.

Based on the above definition, in the present specification, a 3GPP LTE system is called an LTE system or a legacy system. A user equipment (UE) which supports an LTE system is called an LTE UE or a legacy UE. A 3GPP LTE-A system is called an LTE-A system or an evolved system. A UE which supports an LTE-A system is called an LTE-A UE or an evolved UE.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
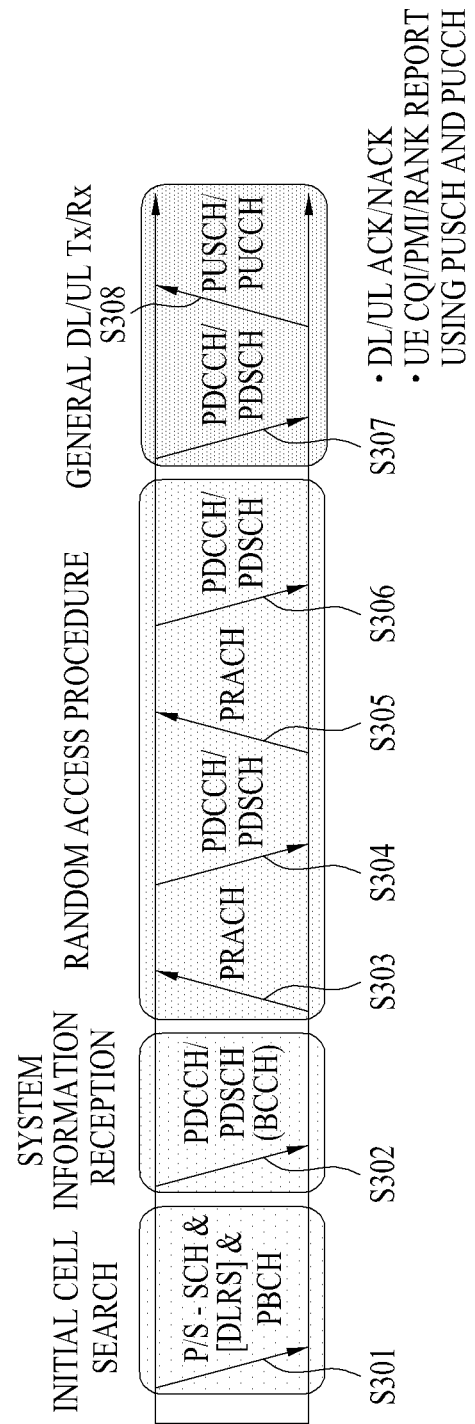
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
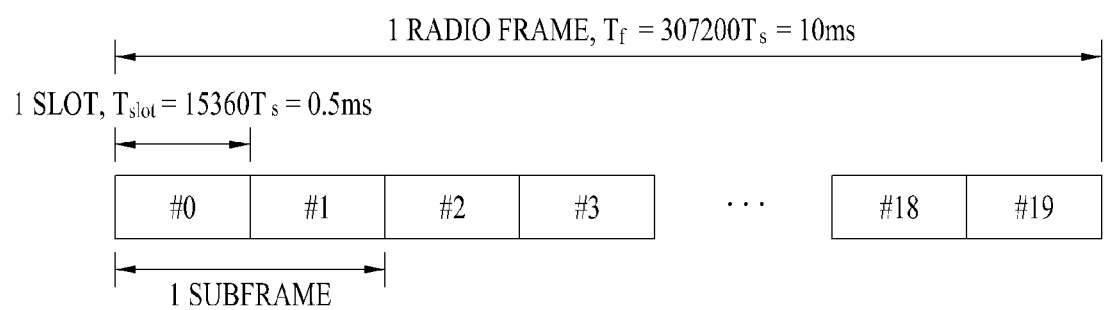
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \cdot T_s$) and includes 10 subframes with the same size. Each of the subframes has a length of 1 ms and includes two slots. Each of the slots has a length of 0.5 ms ($15360 \cdot T_s$). $T_s$ denotes a sampling time, and is represented by $T_s=1/(15 \text{ kHz} \times 2048)=3.2552 \times 10^{-8}$ (about 33 ns). Each slot includes a plurality of OFDM or SC-FDMA symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
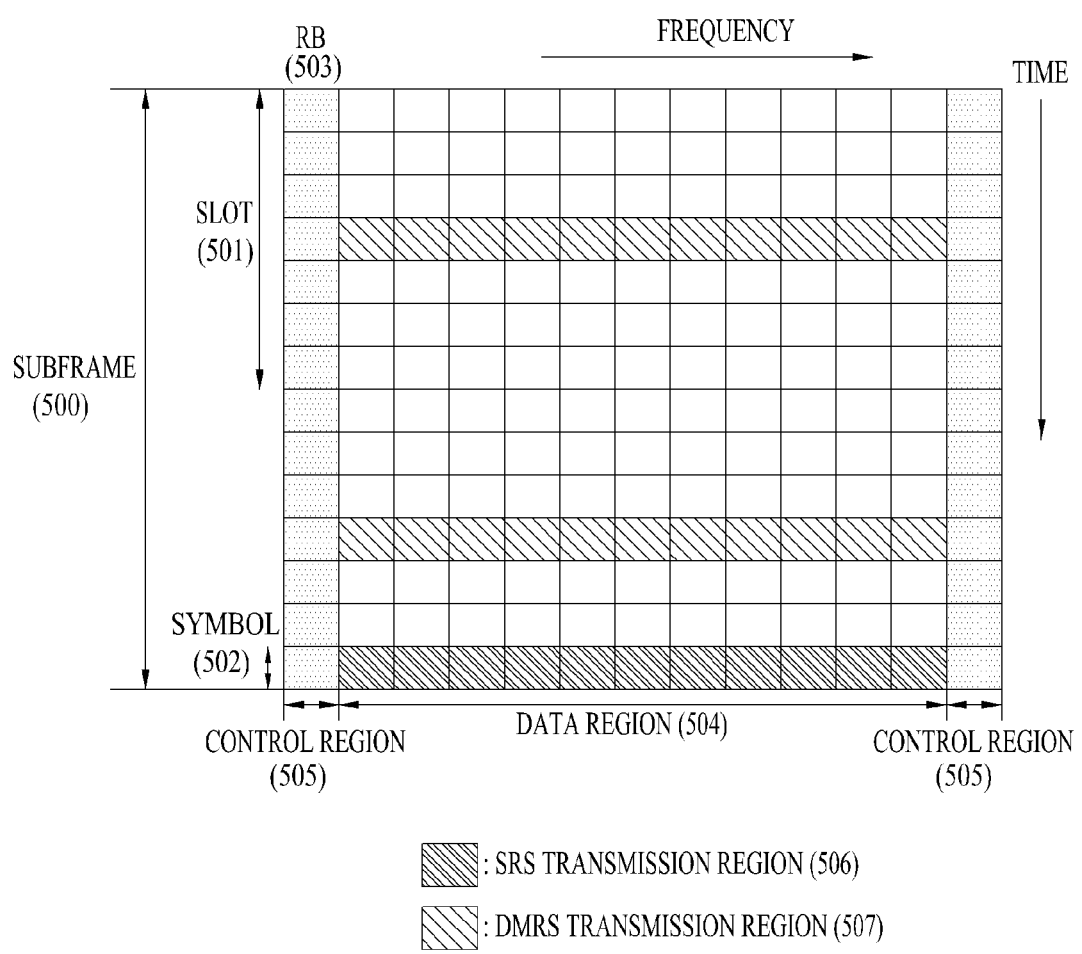
FIG. 5 is a diagram showing the structure of an uplink subframe in an LTE system.

FIG. 5 is a diagram showing the structure of an uplink subframe in an LTE system.

Referring to FIG. 5, a subframe 500 having a length of 1 ms, which is a basic unit of LTE uplink transmission, includes two slots 501 each having a length of 0.5 ms. In case of normal cyclic prefix (CP), each slot includes seven symbols 502 and one symbol corresponds to one SC-FDMA symbol. An RB 503 is a resource allocation unit corresponding to 12 subcarriers in a frequency domain and one slot in a time domain. The structure of the uplink subframe of the LTE is roughly divided into a data region 504 and a control region 505. The data region refers to a series of communication resources used to transmit data such as voice or packets to each UE and corresponds to resources excluding resources belonging to the control region in a subframe. The control region refers to a series of communication resources used to transmit a downlink channel quality report from each UE, reception ACK/NACK for a downlink signal, an uplink scheduling request, etc.

As shown in FIG. 5, a region 506 for transmitting a sounding reference signal (SRS) within one subframe is a part including SC-FDMA symbols located at the very last of a time axis and the SRS is transmitted via a data transmission band on a frequency axis. SRSs of several UEs transmitted using the last SC-FDMA symbols of the same subframe may be distinguished according to frequency locations.

The SRS is composed of constant amplitude zero auto correlation (CAZAC) sequences. SRSs transmitted from several UEs are CAZAC sequences $r^{SRS}(n)=r_{u,v}^{(\alpha)}(n)$ having different cyclic shift values α according to Equation 1.

$$\alpha = 2\pi \frac{n_{SRS}^{cs}}{8} \qquad \text{Equation 1}$$

where, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $p_{SRS}$ of a UE, an SRS sequence $r^{SRS}(n)$ is first multiplied by an amplitude scaling factor $\beta_{SRS}$ and is then mapped to a resource element (RE) having an index (k, l) from $r^{SRS}(0)$ by Equation 2.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \qquad \text{Equation 2}$$

where, $k_0$ denotes a frequency domain start point of an SRS and is defined by Equation 3.

$$k_0 = k'_0 + \sum_{b=0}^{B_{SRS}} 2M_{sc,b}^{RS} n_b \qquad \text{Equation 3}$$

where, $n_b$ denotes a frequency location index. $k'_0$ for a general uplink subframe is defined by Equation 4 and $k'_0$ for an uplink pilot time is defined by Equation 5.

$$k'_0 = (\lfloor N_{RB}^{UL}/2 \rfloor - m_{SRS,0}/2) N_{SC}^{RB} + k_{TC} \qquad \text{Equation 4}$$

$$k'_0 = \qquad \text{Equation 5}$$
$$\begin{cases} (N_{RB}^{UL} - m_{SRS,0}^{max}) N_{sc}^{RB} + k_{TC} & \text{if } \begin{pmatrix}(n_f \bmod 2) \times \\ (2 - N_{SP}) + n_{hf}\end{pmatrix} \bmod 2 = 0 \\ k_{TC} & \text{otherwise} \end{cases}$$

In Equations 4 and 5, $k_{TC}$ denotes a transmissionComb parameter signaled to a UE via a higher layer and has a value of 0 or 1. In addition, $n_{hf}$ is 0 in an uplink pilot time slot of a first half frame and is 0 an uplink pilot slot of a second half frame. $M_{sc,b}^{RS}$ is the length, that is, the bandwidth, if the SRS sequence expressed in subcarrier units defined by Equation 6.

$$M_{sc,b}^{RS} = m_{SRS,b} N_{sc}^{RB}/2 \qquad \text{Equation 6}$$

In Equation 6, $m_{SRS,b}$ is a value signaled from an eNB according to an uplink bandwidth $N_{RB}^{UL}$ as shown in Tables 1 to 4.

In order to acquire $m_{SRS,b}$, a cell-specific parameter $C_{SRS}$ having an integer value of 0 to 7 and a UE-specific parameter $B_{SRS}$ having an integer value of 0 to 3 are necessary. The values of $C_{SRS}$ and $B_{SRS}$ are provided by a higher layer.

TABLE 1

$b_{hop} = 0, 1, 2, 3$ and $6 \leq N_{RB}^{UL} \leq 40$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

$b_{hop} = 0, 1, 2, 3$ and $40 < N_{RB}^{UL} \leq 60$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

$b_{hop} = 0, 1, 2, 3$ and $60 < N_{RB}^{UL} \leq 80$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

$b_{hop} = 0, 1, 2, 3$ and $80 < N_{RB}^{UL} \leq 110$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |

TABLE 4-continued $b_{hop} = 0, 1, 2, 3$ and $80 < N_{RB}^{UL} \leq 110$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

As described above, the UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, if $b_{hop} \geq B_{SRS}$, a frequency location index $n_b$ has a constant value as shown in Equation 7. Here, $n_{RRC}$ is a parameter received from a higher layer.

$$n_b = \lfloor 4n_{RRC}/m_{SRS,b} \rfloor \bmod N_b \qquad \text{Equation 7}$$

Meanwhile, if frequency hopping of the SRS is activated, that is, $b_{hop} < B_{SRS}$, a frequency location index $n_b$ is defined by Equations 8 and 9.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \qquad \text{Equation 8}$$

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \qquad \text{Equation 9}$$

where, $n_{SRS}$ is a parameter used to calculate the number of times of transmitting the SRS and is defined by Equation 10.

$$n_{SRS} = \begin{cases} 2N_{SP}n_f + 2(N_{SP}-1)\lfloor \frac{n_s}{10} \rfloor + \lfloor \frac{T_{offset}}{T_{offset\_max}} \rfloor, & \text{for 2 ms SRS periodicity of TDD frame structure} \\ \lfloor (n_f \times 10 + \lfloor n_s/2 \rfloor)/T_{SRS} \rfloor, & \text{otherwise} \end{cases} \qquad \text{Equation 10}$$

In Equation 10, $T_{SRS}$ denotes the periodicity of an SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Tables 5 and 6 according to FDD and TDD. In particular, Table 5 shows the SRS configuration index for FDD and Table 6 shows the SRS configuration index for TDD.

TABLE 5

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 6

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |

TABLE 6-continued

| Configuration Index $I_{SRS}$ | SRS Periodicity $T_{SRS}$ (ms) | SRS Subframe Offset $T_{offset}$ |
|---|---|---|
| 165-324 | 160 | $I_{SRS}$-165 |
| 325-644 | 320 | $I_{SRS}$-325 |
| 645-1023 | reserved | reserved |

Figure 6:
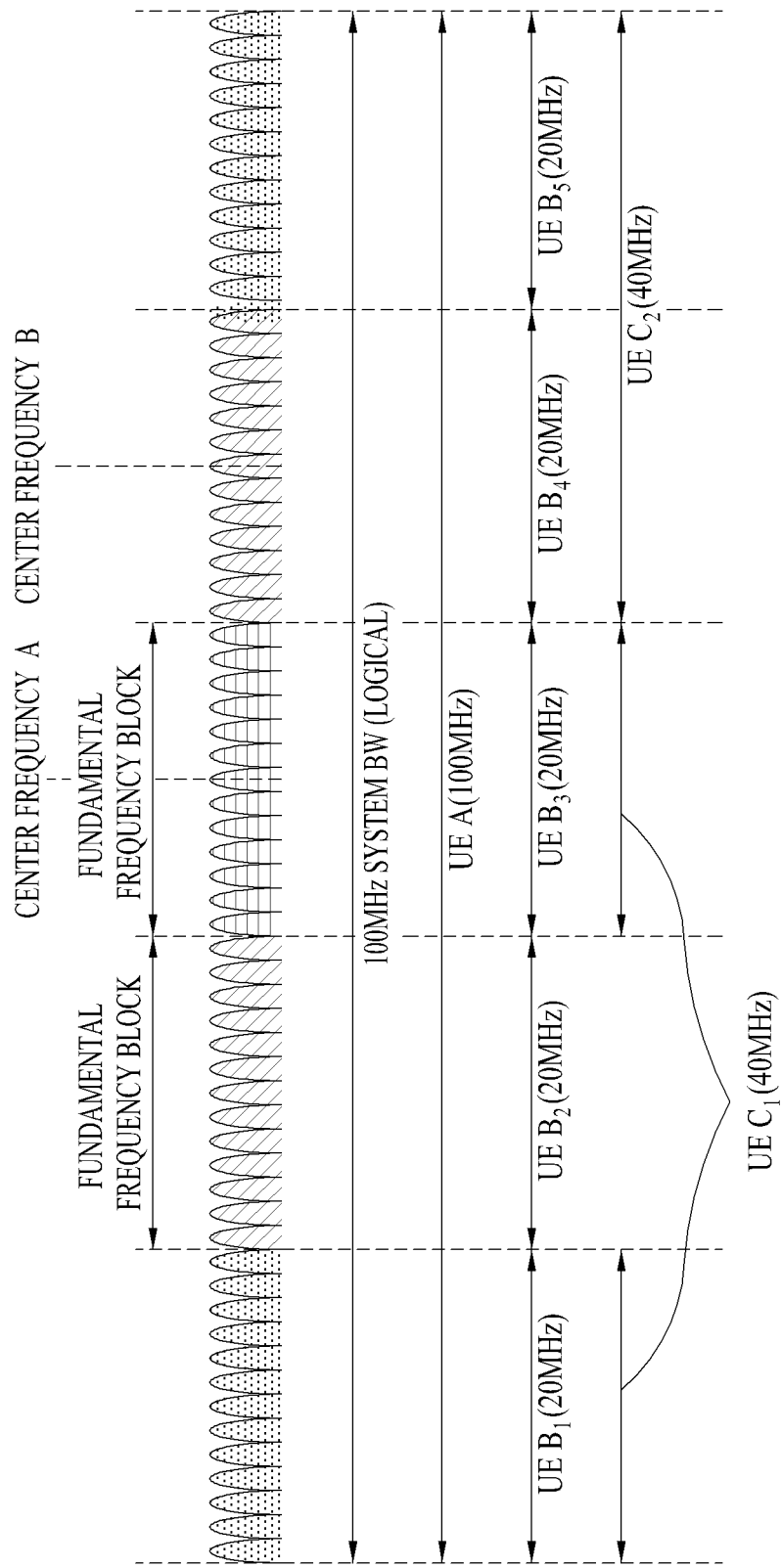
FIG. 6 is a conceptual diagram illustrating a carrier aggregation scheme applied to an LTE-A system.

FIG. 6 is a conceptual diagram illustrating a carrier aggregation scheme applied to an LTE-A system. Carrier aggregation refers to a method of using a plurality of component carriers as a large logical frequency band in order to use a wider frequency band in a radio communication system.

Referring to FIG. 6, an entire system band is a logical band having a maximum bandwidth of 100 MHz. The entire system band includes five component carriers (CCs) and each CC has a maximum bandwidth of 20 MHz. The CC includes one or more physically contiguous subcarriers. Although all CCs have the same bandwidth in FIG. 6, this is only exemplary and the CCs may have different bandwidths. Although the CCs are shown as being contiguous in the frequency domain in FIG. 6, FIG. 6 merely shows the logical concept and thus the CCs may be physically contiguous or separated.

Different center frequencies may be used for the CCs or one common center frequency may be used for physically contiguous CCs. For example, in FIG. 10, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs $B_1$ to $B_5$ may only use a bandwidth of 20 MHz and perform communication using one CC. Each of UEs $C_1$ and $C_2$ may use a bandwidth of 40 MHz and perform communication using two CCs. The two CCs may be contiguous or discontiguous. The UE $C_1$ uses two discontiguous CCs and the UE $C_2$ uses two contiguous CCs.

Hereinafter, a method for transmitting SRSs using a plurality of CCs in an LTE-A system to which the carrier aggregation scheme is applied will be described.

In the LTE-A system, if an eNB allocates a plurality of uplink CCs to a UE, the eNB may independently configure parameters such as allocation of resources to SRSs to be transmitted via uplink CCs allocated to the UE through UE-specific RRC signaling, periodicity and bandwidth. That is, the eNB may signal independent transmission of SRSs via uplink CCs allocated to the UE.

Figure 7:
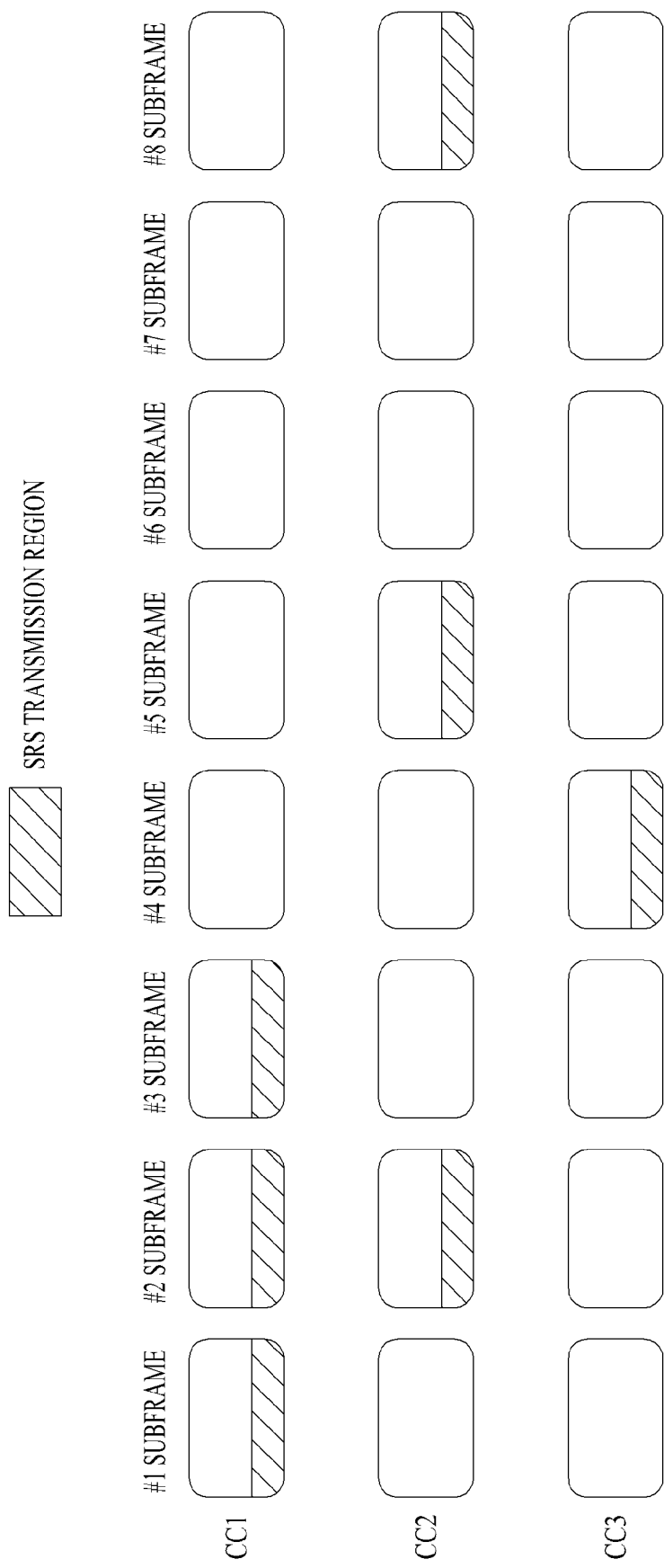
FIG. 7 is a diagram showing an example of transmitting sounding reference signals through a plurality of uplink component carriers according to an embodiment of the present invention.

FIG. 7 is a diagram showing an example of transmitting SRSs via a plurality of uplink CCs according to an embodiment of the present invention.

Referring to FIG. 7, parameters for transmitting the SRSs via respective uplink CCs are independently configured. More specifically, SRSs transmitted via a first CC are transmitted three times and are transmitted via first to third subframes, and SRSs transmitted via a second CC have a periodicity of three subframes and are transmitted to the eNB using a second subframe as a transmission start point.

The SRSs transmitted through a third CC are transmitted once and are transmitted via a fourth subframe.

Meanwhile, in order to reduce signaling overhead, the SRSs transmitted via each uplink CC are preferably associated with each other in terms of resource allocation and parameter configuration. A constraint that a CM/PAPR should not be increased in uplink transmission of the UE should also be satisfied. Accordingly, the eNB equally sets the transmission periodicity of the SRSs transmitted in each uplink CC and sets a transmission start point by applying different time offset values to the uplink CCs such that the subframes via which the SRSs are transmitted in the uplink CCs do not overlap.

Figure 8:
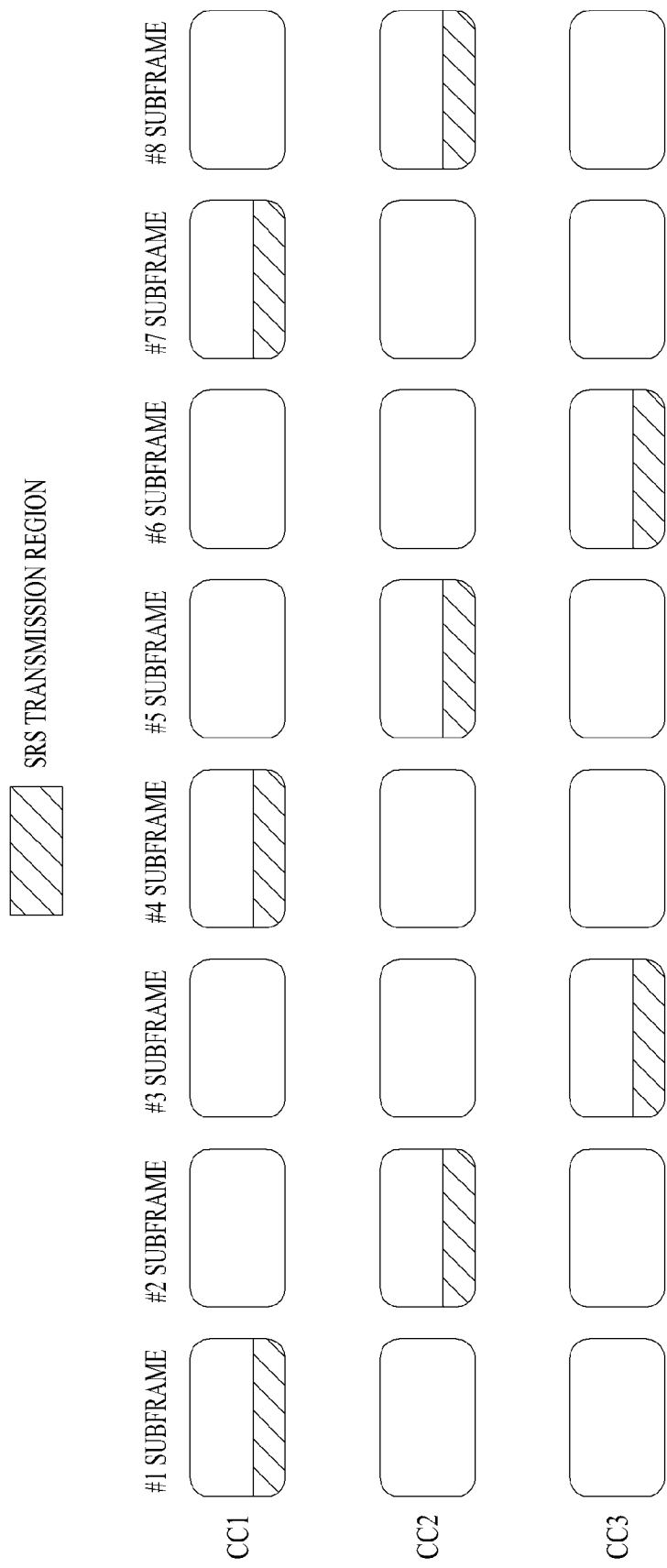
FIG. 8 is a diagram showing an example of transmitting sounding reference signals through a plurality of uplink component carriers according to another embodiment of the present invention.

FIG. 8 is a diagram showing an example of transmitting SRSs through a plurality of uplink CCs according to another embodiment of the present invention.

Referring to FIG. 8, all SRSs transmitted via uplink CCs have a periodicity of three subframes. However, a transmission start point is set such that an offset value of one subframe is applied to an SRS transmitted via a second CC with respect an SRS transmitted via a first CC and an offset value of two subframes is applied to an SRS transmitted via a third CC with respect to the SRS transmitted via the first CC. In such transmission, a CM/PAPR is not increased in uplink transmission of the UE and resources and parameters for transmitting the SRSs are associated with each other, thereby reducing signaling overhead.

As described above, the UE may periodically transmit a general SRS and additionally transmit an aperiodic SRS through separate signaling from the eNB, for example, UE-specific RRC signaling or L1/L2 control signaling. Hereinafter, in a state in which a carrier aggregation scheme may be employed, as described above, an operation of a UE when receiving an indication for additionally transmitting an aperiodic SRS from an eNB will be described.

If the UE receives the indication for transmitting the aperiodic SRS from the eNB in a specific downlink control information (DCI) format, there is a need for an indication as to via which uplink CC the aperiodic SRS is transmitted or using which resources the aperiodic SRS is transmitted.

If transmission of the aperiodic SRS through UE-specific RRC signaling or L1/L2 control signaling is indicated using only 1 bit, the following methods may be considered.

First, setting of an uplink CC for transmitting the aperiodic SRS will be described. First, the uplink CC for transmitting the aperiodic SRS is predetermined and the aperiodic SRS may be set to be transmitted via a primary CC (or an anchor CC) of uplink CCs. Alternatively, if there is an uplink CC (that is, a secondary CC) only for data transmission, the aperiodic SRS may be set to be transmitted via such a CC. Alternatively, the aperiodic SRS may be set to be transmitted via both a primary CC and a secondary CC.

Second, an uplink CC for dynamically transmitting the aperiodic SRS by the eNB is indicated. Such indication information may be transmitted to the UE through UE-specific RRC signaling or L1/L2 control signaling. The uplink CC indicated therein may indicate a specific CC or some CCs of uplink CCs allocated to the UE.

Finally, an uplink CC linked with a downlink CC in which information indicating transmission of the aperiodic SRS is transmitted is set to a CC for transmitting the aperiodic SRS.

Although transmission of the aperiodic SRS is indicated only using 1 bit in the above description, the size of the indication information may be increased to include indication information of one or more uplink CCs for transmitting the aperiodic SRS.

Next, a resource allocation method for transmitting an aperiodic SRS will be described. First, as parameters of the aperiodic SRS, resources used for transmission of the periodic SRS, for example, cell-specific SRS bandwidth setting, UE-specific SRS bandwidth setting, transmissionComb parameter, etc. may be used without change.

Alternatively, the aperiodic SRS may be transmitted using an entire available bandwidth of the system bandwidth regardless of cell-specific SRS bandwidth setting and UE-specific SRS bandwidth setting. For example, SRSs occupying 24 RBs may be transmitted if the system bandwidth is 5 MHz, SRSs occupying 48 RBs may be transmitted if the system bandwidth is 10 MHz, SRSs occupying 72 RBs may be transmitted if the system bandwidth is 15 MHz, and SRSs occupying 96 RBs may be transmitted if the system bandwidth is 20 MHz.

A largest available bandwidth of the system bandwidth may be used as the bandwidth for transmitting the aperiodic SRS and a constant partial bandwidth may be configured so as to be used to selectively transmit the SRS.

The parameters for transmitting the aperiodic SRS, that is, a transmissionComb parameter defined in the periodic SRS, physical start resource block allocation, transmission duration, transmission bandwidth, periodicity, a base sequence index, a cyclic shift value, etc. may be transmitted through physical layer or MAC layer control signaling.

Meanwhile, one time or a restricted number of times of transmission is performed and the SRSs may be set to be transmitted in a predetermined order with a bandwidth having a certain size obtained by dividing a UE-specific maximum bandwidth by the certain size. Control signaling of one time or a restricted number of times of transmission may be transmitted through RRC signaling or L1 control signaling or may be predefined between the UE and the eNB to prevent additional overhead due to additional signaling.

In contrast, the SRS may be set to be transmitted with a bandwidth greater than the UE-specific maximum bandwidth. In this case, the UE may transmit the SRS according to the indication of the eNB even with respect to bandwidth other than the UE-specific maximum bandwidth set thereto.

Figure 9:
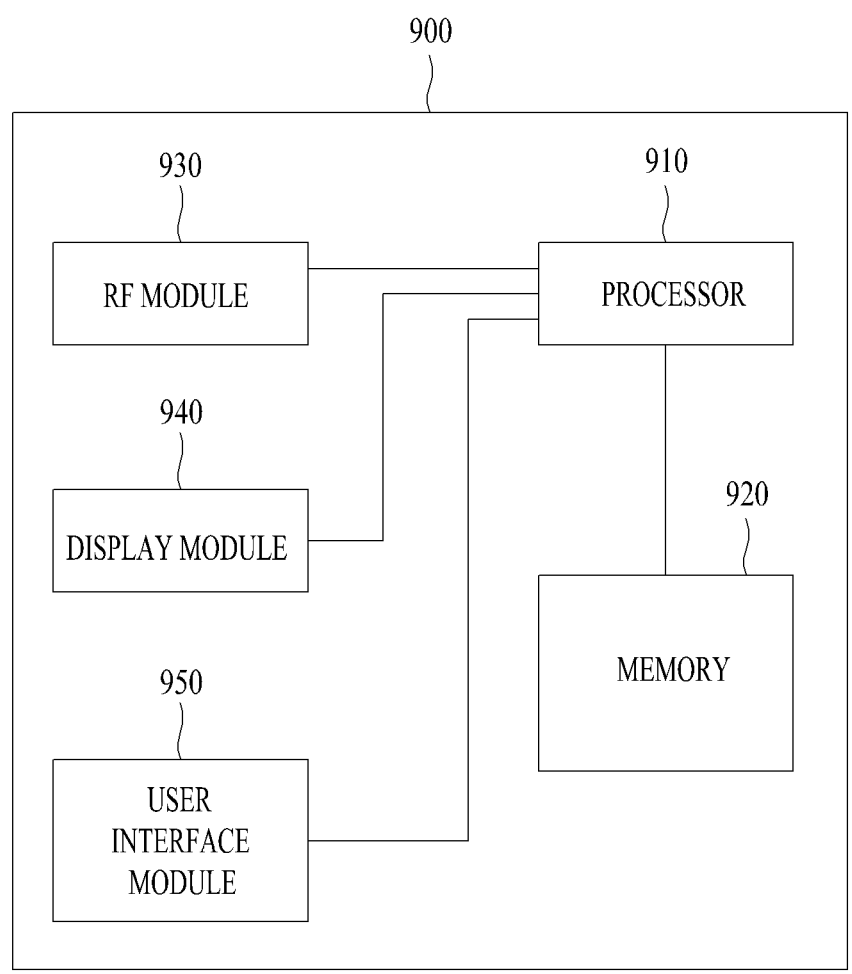
FIG. 9 is a block diagram showing a transmitter or receiver according to an embodiment of the present invention.

FIG. 9 is a block diagram showing a transmitter or receiver according to an embodiment of the present invention. The transmitter or receiver may be a part of an eNB or a UE.

Referring to FIG. 9, a transmitter/receiver 900 includes a processor 910, a memory 920, a Radio Frequency (RF) module 930, a display module 940 and a user interface module 950.

The transmitter/receiver 900 is shown for convenience of description and some modules thereof may be omitted. In addition, the transmitter/receiver 900 may further include necessary modules. In addition, some modules of the transmitter/receiver 900 may be subdivided. The processor 910 is configured to perform an operation of the embodiment of the present invention described with respect to the drawings.

More specifically, if the transmitter/receiver 900 is a portion of an eNB, the processor 910 may perform a function for generating a control signal and mapping the control signal to a control channel set within a plurality of frequency blocks. If the transmitter/receiver 900 is a portion of a UE, the processor 910 may confirm a control channel indicated thereto from a signal received through a plurality of frequency blocks and extract a control signal.

Thereafter, the processor 910 may perform a necessary operation based on the control signal. For a detailed description of the operation of the processor 910, reference may be made to the description associated with FIGS. 1 to 8.

The memory 920 is connected to the processor 910 so as to store an operating system, an application, program code, data and the like. The RF module 930 is connected to the processor 910 so as to perform a function for converting a baseband signal into a radio signal or converting a radio signal into a baseband signal. The RF module 930 performs analog conversion, amplification, filtering and frequency up-conversion or inverse processes thereof. The display module 940 is connected to the processor 910 so as to display a variety of information. As the display module 940, although not limited thereto, a known device such as a Liquid Crystal Display (LCD), a Light Emitting Diode (LED), or an Organic Light Emitting Diode (OLED) may be used. The user interface module 950 is connected to the processor 910 and may be configured by a combination of known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. Moreover, it will be apparent that some claims referring to specific claims may be combined with another claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "User Equipment (UE)" may also be replaced with the term subscriber station (SS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a radio communication system and, more particularly, to a method and apparatus for transmitting sounding reference signals in a radio communication system to which carrier aggregation is applied.

The invention claimed is:

1. A method for transmitting sounding reference signals by a user equipment in a radio communication system to which a carrier aggregation scheme is applied, the method comprising:
receiving information about a plurality of uplink component carriers for transmitting periodic sounding reference signals from a base station;
allocating different time resources to the periodic sounding reference signals respectively transmitted via the plurality of uplink component carriers; and
transmitting the periodic sounding reference signals to the base station using the uplink component carriers and the allocated different time resources,
wherein the information about the plurality of uplink component carriers includes information about transmission start points of the periodic sounding reference signals respectively transmitted through the plurality of uplink component carriers, and
wherein the periodic sounding reference signals respectively transmitted through the plurality of uplink component carriers have a same transmission periodicity.

2. The method according to claim 1, wherein the information about the plurality of uplink component carriers includes parameters for transmitting the periodic sounding reference signals in units of the uplink component carriers.

3. The method according to claim 1, further comprising:
receiving an indication for transmitting an aperiodic sounding reference signal from the base station; and
transmitting the aperiodic sounding reference signal to the base station.

4. The method according to claim 3, wherein the aperiodic sounding reference signal is transmitted to the base station via a predetermined uplink component carrier.

5. The method according to claim 3, further comprising receiving resource allocation information for transmitting the aperiodic sounding reference signal from the base station, wherein the resource allocation information includes information about an uplink component carrier for transmitting the aperiodic sounding reference signal.

6. A user equipment of a radio communication system to which a carrier aggregation scheme is applied, the user equipment comprising:
a reception module configured to receive information about a plurality of uplink component carriers for transmitting periodic sounding reference signals from a base station;
a processor configured to allocate different time resources to the periodic sounding reference signals respectively transmitted via the plurality of uplink component carriers; and
a transmission module configured to transmit the periodic sounding reference signals to the base station using the uplink component carriers and the allocated different time resources,
wherein the information about the plurality of uplink component carriers includes information about transmission start points of the periodic sounding reference signals respectively transmitted through the plurality of uplink component carriers, and
wherein the periodic sounding reference signals respectively transmitted through the plurality of uplink component carriers have a same transmission periodicity.

7. The user equipment according to claim 6, wherein the information about the plurality of uplink component carriers includes parameters for transmitting the periodic sounding reference signals in units of the uplink component carriers.

8. The user equipment according to claim 6, wherein the reception module receives an indication for transmitting an aperiodic sounding reference signal from the base station, and the transmission module transmits the aperiodic sounding reference signal to the base station.

9. The user equipment according to claim 8, wherein the aperiodic sounding reference signal is transmitted to the base station via a predetermined uplink component carrier.

10. The user equipment according to claim 8, wherein the reception module receives resource allocation information for transmitting the aperiodic sounding reference signal from the base station, and the resource allocation information includes information about an uplink component carrier for transmitting the aperiodic sounding reference signal.

* * * * *